(12) United States Patent
Liu et al.

(10) Patent No.: US 7,879,446 B2
(45) Date of Patent: Feb. 1, 2011

(54) FLUORINATED CYCLIC OLEFIN ELECTRET FILM

(75) Inventors: Jonq-Min Liu, Hsinchu (TW);
Dar-Ming Chiang, Hsinchu (TW);
Jen-Luan Chen, Taipei (TW);
Mei-Rurng Tseng, Hsinchu (TW)

(73) Assignee: Industrial Technology Research Institute (TW)

( * ) Notice: Subject to any disclaimer, the term of this patent is extended or adjusted under 35 U.S.C. 154(b) by 872 days.

(21) Appl. No.: 11/776,553

(22) Filed: Jul. 12, 2007

(65) Prior Publication Data

US 2009/0017295 A1 Jan. 15, 2009

(51) Int. Cl.
*B32B 27/08* (2006.01)
*B32B 27/28* (2006.01)
*B32B 27/32* (2006.01)
*G11C 13/02* (2006.01)

(52) U.S. Cl. .................. 428/421; 428/500; 428/900; 307/400; 526/280; 526/281

(58) Field of Classification Search ............. None
See application file for complete search history.

(56) References Cited

U.S. PATENT DOCUMENTS

| 4,291,245 | A * | 9/1981 | Nowlin et al. ............ 307/400 |
| 6,806,593 | B2 * | 10/2004 | Tai et al. ................ 307/400 |
| 6,906,257 | B2 * | 6/2005 | Saccomanno et al. ...... 174/36 |
| 7,498,699 | B2 * | 3/2009 | Chiang et al. ............ 307/400 |
| 7,732,547 | B2 * | 6/2010 | Chen et al. .............. 526/280 |
| 2002/0187350 | A1 * | 12/2002 | Saccomanno et al. .... 428/411.1 |
| 2005/0008848 | A1 * | 1/2005 | Saccomanno et al. ..... 428/328 |
| 2005/0107555 | A1 * | 5/2005 | Chiang et al. ............ 526/255 |
| 2006/0113862 | A1 * | 6/2006 | Suzuki et al. ............ 310/309 |
| 2009/0018269 | A1 * | 1/2009 | Chen et al. .............. 525/72 |

FOREIGN PATENT DOCUMENTS

| JP | 63-238111 | * 10/1988 |
| JP | 63-238115 | * 10/1988 |

* cited by examiner

*Primary Examiner*—Vivian Chen
(74) *Attorney, Agent, or Firm*—Lowe Hauptman Ham & Berner, LLP

(57) ABSTRACT

The present invention provides a fluorinated cyclic olefin electret film including a fluorinated cyclic olefin polymer film characterized by having a cyclic olefin polymer grafted with a fluorocarbon alkyl group, and a parylene film over the fluorinated cyclic olefin polymer film.

9 Claims, 2 Drawing Sheets

FLUORINATED CYCLIC OLEFIN ELECTRET FILM

BACKGROUND OF THE INVENTION

The present invention generally relates to an electret film, and more particularly to a fluorinated cyclic olefin electret film.

Organic polymers have been known for their commercial application in making dielectric materials such as electrets. Typically, the organic polymers are made into polymer electrets by charge injection. U.S. Pat. No. 4,291,245 to Nowlin et al. disclosed polymer electrets and process for preparing the polymer electrets. The polymer electrets usually provide useful components of electrical devices, such as acoustic transducers, electrographic devices, and photocopy machines. U.S. Pat. No. 6,806,593 to Tai et al. described forming electrets from an organic polymer film. The electrets are formed by micro-machining technology in the manufacture of miniature electret microphones.

Electrets prepared by charge injection may result in a surface charge that is vulnerable to degradation by dust and humidity. The charges within the electrets may also be degraded as a result of physical vibrations or contacts with metal wires, charged bodies and conductors. A number of small, high quality, and inexpensive electret designs are currently available. However, none of the designs has been provided to minimize charge degradations for the electrets.

BRIEF SUMMARY OF THE INVENTION

The present invention provides a fluorinated cyclic olefin electret film which includes a fluorinated cyclic olefin polymer film characterized by having a cyclic olefin polymer grafted with a fluorocarbon alkyl group, and a parylene film over the fluorinated cyclic olefin polymer film.

In one embodiment, the present invention provides a process for preparing fluorinated cyclic olefin electret films, which comprises the steps of providing a fluorinated cyclic olefin polymer film characterized by having a fluorocarbon alkyl group grafted on a cyclic olefin polymer, providing a p-xylene monomer vapor in a sufficient amount to coat the fluorinated cyclic olefin polymer film, and introducing the vapor and the fluorinated cyclic olefin polymer film in an evaporation chamber, said chamber being under vacuum and at a temperature at which the vapor condenses, whereby the fluorinated cyclic olefin polymer film is coated with a parylene film.

In another embodiment, the present invention provides a composition having about 10% to about 99.5% by weight of a thermoplastic resin, and about 0.05 to about 90% by weight of the fluorinated cyclic olefin electret films prepared by the above process.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
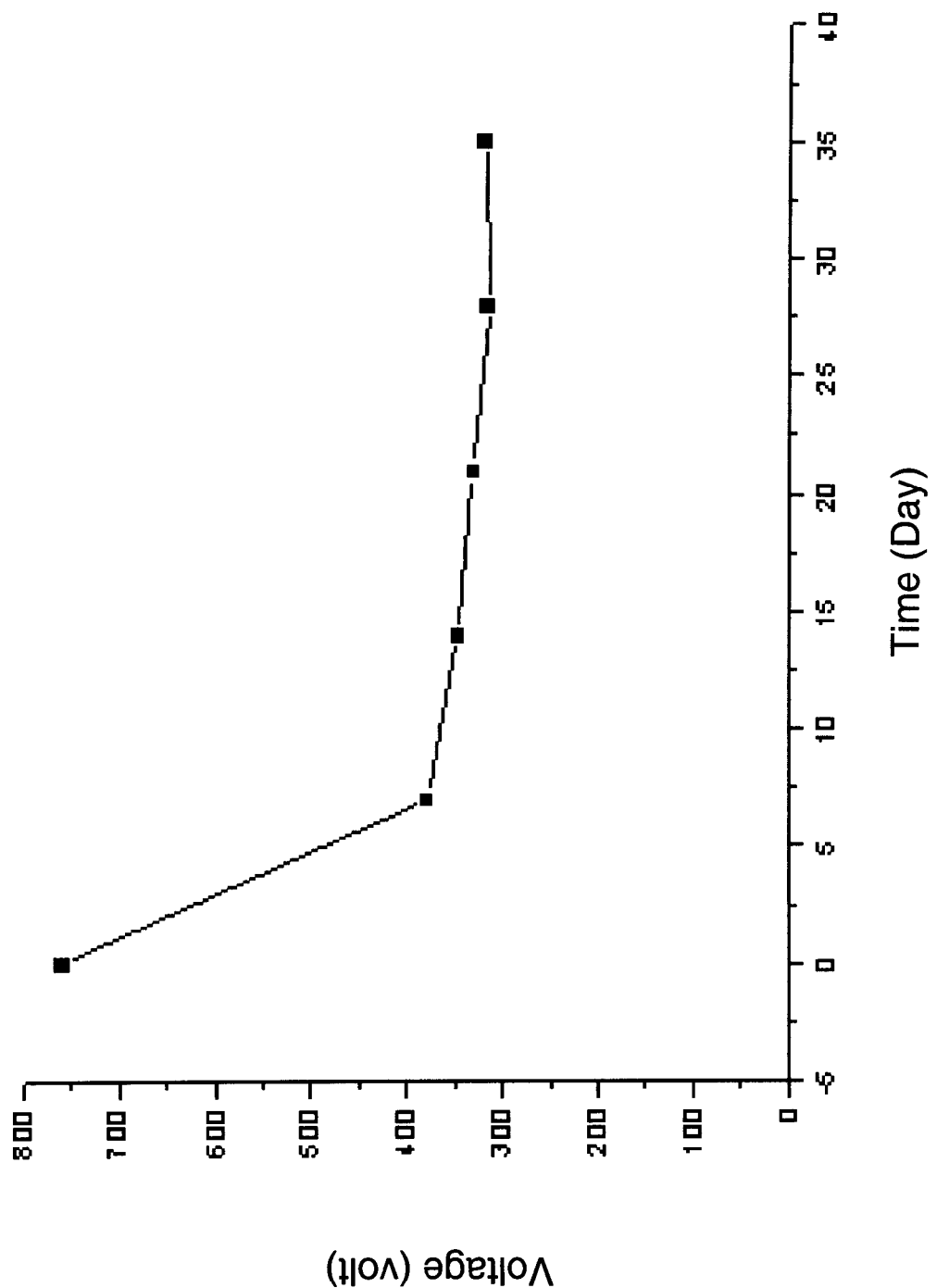
FIG. 1 is a curve illustrating a surface voltage test result for a conventional electret film.

The present invention provides a fluorinated cyclic olefin electret film which includes a fluorinated cyclic olefin polymer film that is characterized by having a cyclic olefin polymer grafted with a fluorocarbon alkyl group, and a parylene film over the fluorinated cyclic olefin polymer film. In accordance with examples of the present invention, the cyclic olefin polymer may include olefin polymers or their derivatives having a glass transition temperature of about 60° C. to 250° C. and a molecular weight of about 400 to 300000.

The fluorinated cyclic olefin polymer film may also be provided, for example, in the form of copolymers, such as block copolymers, alternative copolymers or random copolymers. The fluorinated cyclic olefin polymer film may be formed, for example, by grafting the fluorocarbon alkyl group on the cyclic olefin copolymer. In some examples, the cyclic olefin copolymers may be formed by copolymerizing monomers such as ethylene, propylene, $C_{4-16}$ α-olefins, or a combination thereof, with cyclic olefin monomers. In accordance with other examples, the cyclic olefin monomers may be chosen from, but are not limited to, bicycloheptene, tricyclcodecaene and tetracyclododecene. The cyclic olefin monomers may also contain additional elements, such as fluorine, chlorine or oxygen atoms, which may attach to the monomers during the polymerization reaction. In addition, the cyclic olefin monomers may also comprise alkyl groups as optional substituents. In another embodiment, there may be chlorine atoms, oxygen atoms, or both, on the cyclic olefin polymer and fluorocarbon alkyl group.

In another embodiment of the present invention, the fluorocarbon alkyl groups may include $C_{1-30}$ fluorocarbon alkyl chains in the fluorinated cyclic olefin polymer film. However, the fluorinated cyclic olefin electret film of the present invention is not limited to having the fluorocarbon alkyl chains in the fluorinated cyclic olefin polymer film. Other partially fluorinated or perfluoroalkyl groups and their derivatives may also be included as the unsaturated monomers to form the side chains in the fluorinated cyclic olefin polymer film. In another embodiment of the present invention, the unsaturated monomers may be homopolymerized before grafting on the monomer segment of the cyclic olefin polymer. The fluorocarbon alkyl groups may comprise acyclic or cyclic alkyl chains having the formula:

wherein n is 1 or 2, Rf and Rf' both comprise $C_{1-30}$ fluorocarbon alkyl chains. Other fluorinated cyclic olefin polymers, copolymers or their derivatives with similar structures may also be encompassed within the scope of the invention.

In accordance with some examples, the fluorinated cyclic olefin polymer film may be coated with a parylene film, which comprises at least one of parylene N, parylene D and parylene C. Parylene generally is produced by the polymerization of para-xylylene, or its substituted derivatives. The parylene film may also comprise other para-xylylene monomers and substituted derivatives. For example, there may be cyano, ortho-dicyano, chloro or dichloro substituents to the para-xylylene aromatic ring. There may also be fluorine atoms, chorine atoms, or a combination thereof on the para-xylylene. Such atoms may be substituents for the hydrogen atoms of the methylene group in para-xylylene. Alternatively, the atoms may be attached by chemical bonds to the methylene group or other functional groups of the para-xylylene.

Parylene has been known to provide coating for materials such as plastic, rubber, metals, micro-electro-mechanical systems (MEMS) compatible material, woods, papers and inorganic materials. Therefore, the parylene film of the present invention may be formed by any method known in the field, for example, evaporation or deposition methods known to those skilled in the art. In one embodiment of the present invention, parylene monomers in the form of parylene vapor may be provided for coating the fluorinated cyclic olefin polymer. The parylene vapor may then be directed to the fluorinated cyclic olefin polymer and brought to a temperature at which the vapor condenses, so that the parylene film may be coated on the fluorinated cyclic olefin polymer film. In other examples, the parylene film may be prepared by converting parylene monomers into pre-polymers before the pre-polymers are coated by precision coating, dip coating, spray coating, vacuum deposition, chemical vapor deposition (CVD) or slit coating to form a protective film over the fluorinated cyclic olefin polymer film. The parylene film may have a thickness of about 0.1 to 10 μm. For example, the parylene film may have a thickness of about 1 μm.

In another embodiment of the present invention, the fluorinated cyclic olefin electret film further comprises a conductive film on one side of the electret film. The fluorinated cyclic olefin electret film comprises a parylene film coated on the other side of the electret film. However, the structure of the fluorinated cyclic olefin electret film is not limited to those described in the examples. Other similar structures having additional metal or parylene overcoat over the fluorinated cyclic olefin electret film may also be encompassed by the scope of the invention.

The present invention also provides a process for preparing fluorinated cyclic olefin electret films. The process comprises the steps of providing a fluorinated cyclic olefin polymer film characterized by having a fluorocarbon alkyl group grafted on a cyclic olefin polymer, providing a para-xylylene (p-xylylene) monomer vapor in a sufficient amount to coat the fluorinated cyclic olefin polymer film, and introducing the vapor and the fluorinated cyclic olefin polymer film in an evaporation chamber. For example, the chamber may be kept under vacuum and at a temperature at which the vapor condenses, so that the fluorinated cyclic olefin polymer film is coated with a parylene film to form the fluorinated cyclic olefin electret film.

In one embodiment of the present invention, the process for coating the parylene film may comprise three steps. The first step is vaporization of the solid dimer, such as cyclic di-p-xylylene at approximately 150° C. to about 200° C. The second step is the quantitative cleavage or pyrolysis of the dimer which involves breaking of the benzylic carbon to carbon bonds at about 670° C. to about 690° C. to yield the p-xylylene monomer in vapor state. Finally, the monomer enters a room temperature deposition chamber containing the fluorinated cyclic olefin polymer film. Accordingly, the monomer condenses and polymerizes on all of the exposed surface of the fluorinated cyclic olefin polymer film to provide a thin parylene film thereon. The apparatus that may be used in this embodiment may include a vaporized section, a pyrolysis zone, and a deposition chamber, all of which are connected by tubing. In such an apparatus, the deposition chamber has a valved outlet connected to a pump for providing the required pressure. In addition, there is also provided a heating means for vaporizing and pyrolysis in the apparatus.

In another embodiment of the present invention, the electret films may be blended with thermoplastic resins as compositions. Suitable thermoplastic resins that may be blended with the electret films described herein include, but are not limited to, polyethylene (PE), polypropylene (PP), polyolefin, polyester, polyacrylate, polynitrile, polystyrene, polycarbonate, cyclic olefin copolymer, thermoplastic elastomer, and copolymers, derivatives and combinations thereof. Examples of such blended compositions may have about 10% to about 99.5% by weight of a thermoplastic resin, and about 0.05% to about 90% by weight of the electret films described above.

As described above, in one embodiment of the present invention, a protective film may be formed having a thickness ranging from about 0.1 to 10 μm, depending on the coating methods adopted. The protective film may have a high tolerance for temperature fluctuations subjected to the electret film. The protective film described herein may also have a high degree of transparency. Also, the process for preparing fluorinated cyclic olefin electret films according to the present invention may be implemented without modifying charging procedures for the electret film. In addition, the protective film may be flexible and moisture-proof so as to help promote an electret film that has stable electrical properties.

An electret film and the composition thereof of the present invention may be applicable to manufacture of a variety of devices. For example, the electret films may be included as part of the filters, such as virus filters and aerosol filters. For acoustic applications, the electret films may be incorporated into electret condensers, silicon electret condensers, loudspeakers (audio beam), ultrasonic applications, hydrophones and headphones. The electret films may also be applicable in manufacturing electronic devices, such as saw filters, electret relays, electro-optic switches and transducers. Industrial applications of the electret films also include electret motors, solar cells, air filters and dosimeters. In addition, the electret films may be applicable to electrophotography. For example, the electret films may be included in xerography devices and electrostatic recorders.

The invention will now be described in further detail with reference to the following specific, non-limiting examples.

Reference will now be made in detail to the present embodiments of the invention, examples of which are illustrated in the accompanying drawings.

Example 1

Preparation of Fluorinated Cyclic Olefin Eletret Film

Seven grams of parylene N powder were placed in a vaporized tank connected to a pyrolysis chamber and deposition chamber by tubing. A fluorinated cyclic olefin polymer film having a thickness of about 6 μm and a diameter of about 6 cm was placed on a rotator dish in the deposition chamber. The vacuum valve in the deposition chamber was opened to reduce the pressure to about 0.5 Torr or below. By heating up the vaporized tank to about 150° C., parylene N was vaporized to provide a cyclic dimer such as cyclic di-p-xylylene. Next, the vaporized dimer was introduced to the pyrolysis chamber, where the vaporized dimer was converted by breaking the benzylic carbon to carbon bonds to p-xylylene monomers when the pyrolysis chamber was heated up to about 680° C. The monomers were then passed through the deposition chamber, where the monomers were condensed and polymerized on the fluorinated cyclic olefin polymer film to provide a thin parylene film having a thickness of about 1 μm at the room temperature. Once the deposition was completed, the temperature of the deposition chamber was reduced to the ambient temperature. A fluorinated cyclic olefin electret film sample was then taken out of the deposition chamber.

Example 2

Surface Discharge Test

A fluorinated cyclic olefin eletret film of example 1 was subjected to a surface discharge test. The electret film included a thickness of the parylene film of about 1 μm on the fluorinated cyclic olefin polymer film having a thickness of about 15 μm. The electret film was charged by corona discharge at a voltage of about 14,000 volts for about 30 seconds. The charged film was then stored in a PE plastic bag for various periods of time. The film was then removed from the bag using a PE clamp for conducting the surface discharge testing.

Figure 2:
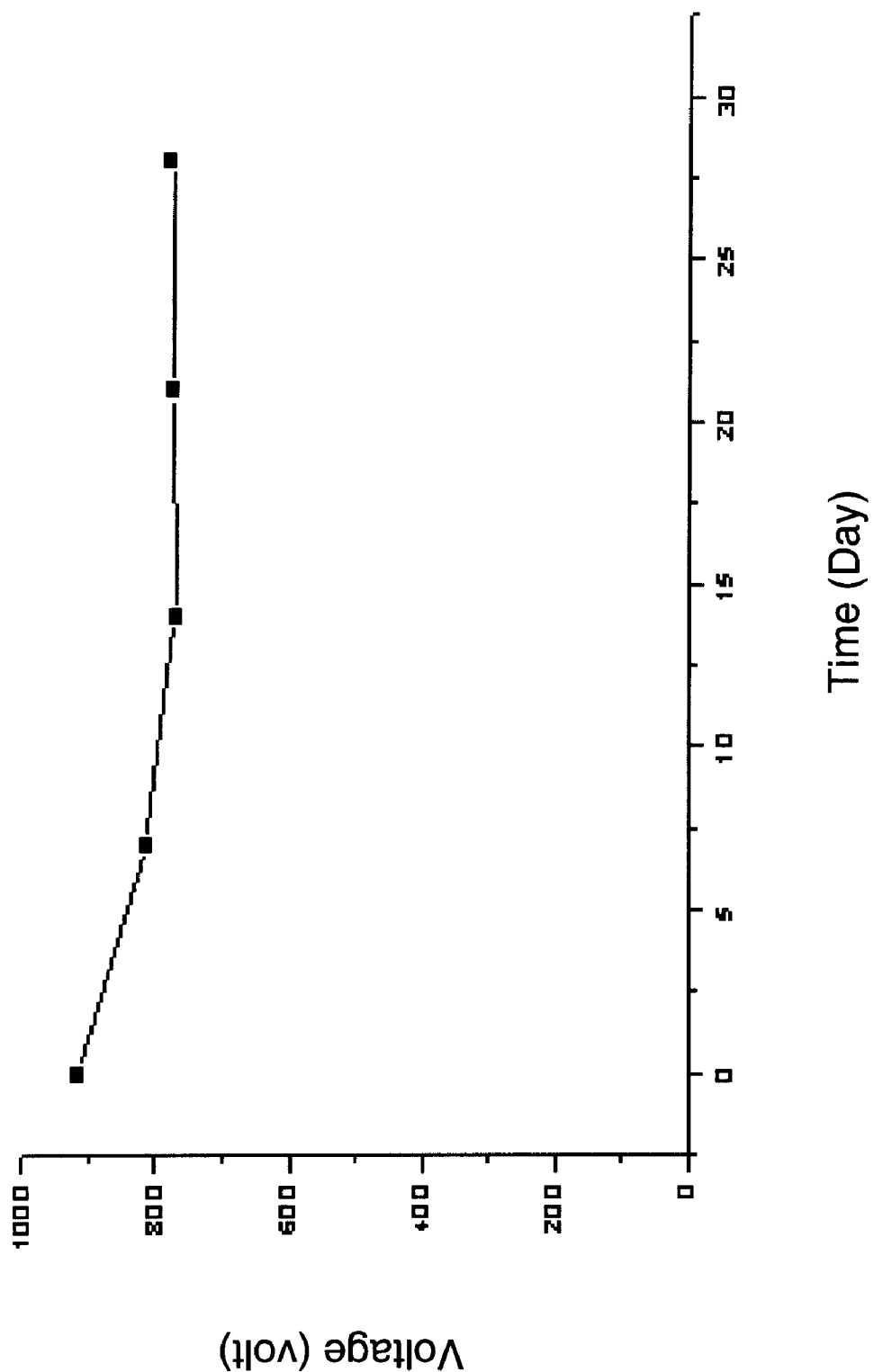
FIG. 2 is a curve illustrating a surface voltage test result for a fluorinated cyclic olefin electret film according to the present invention.

Referring to FIG. 2, the electret film was measured to possess a voltage of about 900 volts at the beginning. Over the next few days, the measured voltage of the electret film quickly decayed by surface discharge to a stable state of about 800 volts in a day period as shown in FIG. 2. Accordingly, the electret film only had about a 10% drop in voltage by voltage decay. In contrast, by referring to FIG. 1, the surface charge test result for the conventional electret film without parylene protection shows a much steeper voltage decay over a 5 day period. After the 5 day period, the measured voltage of the conventional electret film dropped by more than 60% at a stable voltage of about 300 volts. Therefore, it was evident that the electret film of the present invention had a relatively smaller charge decay rate and a higher charge density than the conventional electret film.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A fluorinated cyclic olefin electret film comprising: a fluorinated cyclic olefin polymer film characterized by having a cyclic olefin polymer grafted with a fluorocarbon alkyl group; and a parylene film over the fluorinated cyclic olefin polymer film.

2. The fluorinated cyclic olefin electret film according to claim 1, wherein the fluorocarbon alkyl group is grafted on a monomer segment of the cyclic olefin polymer, and the monomer segment comprises at least one of ethylene, propylene, α-olefin and cyclic olefin monomers.

3. The fluorinated cyclic olefin electret film according to claim 1, wherein the parylene film comprises at least one of parylene N, parylene D and parylene C.

4. The fluorinated cyclic olefin electret film according to claim 1, wherein the parylene film comprises para-xylylene with at least one of cyano or dicyano substituents.

5. The fluorinated cyclic olefin electret film according to claim 1, wherein the parylene film the parylene film comprises para-xylylene with at least one of fluorine and chlorine atoms as substituents.

6. The fluorinated cyclic olefin electret film according to claim 1, wherein the parylene film is formed by evaporation over the fluorinated cyclic olefin polymer.

7. The fluorinated cyclic olefin electret film according to claim 1, wherein the parylene film has a thickness of about 0.1 to 10 μm.

8. The fluorinated cyclic olefin electret film according to claim 1 further comprising a conductive film on one side of the fluorinated cyclic olefin polymer film.

9. A composition comprising:
   about 10% to about 99.5% by weight of a thermoplastic resin; and
   about 0.05 to about 90% by weight of the fluorinated cyclic olefin electret film according to claim 1.

* * * * *